(12) United States Patent
Dai et al.

(10) Patent No.: US 6,940,692 B2
(45) Date of Patent: Sep. 6, 2005

(54) MAGNETIC RECORDING HEAD HAVING A CORROSION-PROTECTIVE LAYER OF A METAL SALT OF A PERFLUORINATED POLYETHER ACID

(75) Inventors: Qing Dai, San Jose, CA (US); Paul Haruo Kasai, Morgan Hill, CA (US); Wing Tsang Tang, Palo Alto, CA (US)

(73) Assignee: International Business Machines, Armonk, NY (US)

(*) Notice: Subject to any disclaimer, the term of this patent is extended or adjusted under 35 U.S.C. 154(b) by 60 days.

(21) Appl. No.: 10/632,486

(22) Filed: Jul. 31, 2003

(65) Prior Publication Data

US 2004/0021984 A1 Feb. 5, 2004

Related U.S. Application Data

(62) Division of application No. 09/759,117, filed on Jan. 11, 2001, now Pat. No. 6,638,622.

(51) Int. Cl.[7] .............................................. G11B 5/147
(52) U.S. Cl. ....................................................... 360/126
(58) Field of Search ................................. 360/126, 125, 360/317, 318; 29/852; 428/408, 213, 336; 174/262

(56) References Cited

U.S. PATENT DOCUMENTS

| | | | |
|---|---|---|---|
| 3,367,868 A | 2/1968 | Skehan | 508/517 |
| 4,169,904 A | 10/1979 | Czornyj et al. | 427/496 |
| 4,404,247 A * | 9/1983 | Dominguez-Burguette et al. | 428/213 |
| 4,526,833 A * | 7/1985 | Burguette et al. | 428/336 |
| 4,659,633 A | 4/1987 | Yamaguchi et al. | 428/695 |
| 4,757,145 A | 7/1988 | Caporiccio et al. | 546/81 |
| 4,786,544 A | 11/1988 | Saito | 428/143 |
| 4,816,334 A | 3/1989 | Yokoyama et al. | 428/336 |
| 5,000,864 A | 3/1991 | Strepparola et al. | 508/249 |
| 5,030,494 A | 7/1991 | Ahlert et al. | 428/68.5 |
| 5,049,410 A | 9/1991 | Johary et al. | 428/131 |
| 5,091,249 A | 2/1992 | Nishikawa et al. | 427/336 |
| 5,124,058 A | 6/1992 | Corti et al. | 428/509 |
| 5,211,861 A | 5/1993 | Lafratta et al. | 508/509 |
| 5,435,927 A | 7/1995 | Beckwith et al. | 508/501 |
| 5,453,539 A | 9/1995 | Kondo et al. | 508/586 |
| 5,456,980 A | 10/1995 | Murakami et al. | 562/336 |
| 5,525,392 A | 6/1996 | Baum et al. | 428/65.5 |
| 5,858,536 A | 1/1999 | Yanagisawa | 428/408 |
| 6,071,609 A | 6/2000 | Furutani et al. | 428/332 |
| 6,093,495 A | 7/2000 | Falcone | 428/422 |
| 6,204,456 B1 * | 3/2001 | Lauffer et al. | 174/262 |
| 6,427,325 B1 * | 8/2002 | Johansson et al. | 29/852 |
| 6,638,622 B2 * | 10/2003 | Dai et al. | 428/408 |

FOREIGN PATENT DOCUMENTS

JP   01-159830   6/1989

OTHER PUBLICATIONS

Doan et al. (1997), "Dimerization of Carboxylic Acids and Salts: An IR Study in Perfluoropolyether Media," *J. Am. Chem. Soc.* 119(41):9810–9815.

* cited by examiner

*Primary Examiner*—Tianjie Chen
(74) *Attorney, Agent, or Firm*—Harry C. Thibault; Dianne E. Reed; Reed Intellectual Property Law Group

(57) ABSTRACT

A process is provided for synthesizing metal salts of perfluorinated polyethers containing at least one carboxylic acid group. The polymeric salts so provided are effective as anti-wetting and corrosion-protective agents. The metal salts of perfluorinated polyether acids may be used to prepare corrosion-protected substrates, including magnetic recording disks and magnetic recording heads.

11 Claims, 9 Drawing Sheets

Bare surface, after etching (48 spots/1.9 mm$^2$):

Surface treated with Z(COONa)$_2$, after etching (15 spots/1.9 mm$^2$):

MAGNETIC RECORDING HEAD HAVING A CORROSION-PROTECTIVE LAYER OF A METAL SALT OF A PERFLUORINATED POLYETHER ACID

CROSS-REFERENCE TO RELATED APPLICATIONS

This is a divisional of U.S. patent application Ser. No. 09/759,117, filed Jan. 11, 2001, now U.S. Pat. No. 6,638,622 B2; the disclosure of which is incorporated by reference in its entirety.

TECHNICAL FIELD

This invention relates generally to perfluorinated polyethers and uses thereof. More particularly, the invention pertains to metal salts of perfluorinated polyethers having carboxylic acid end groups, to methods for synthesizing the metal salts, and to use thereof as anti-wetting and/or corrosion-protective agents, e.g., in anti-wetting and/or corrosion-protective coatings on metal-containing substrates, particularly in magnetic recording devices such as magnetic recording disks and magnetic recording heads.

BACKGROUND

It is well known that organic carboxylic acids, R—COOH, in a fluid state (liquid or vapor) primarily exist in the hydrogen bonded dimeric form, as follows:

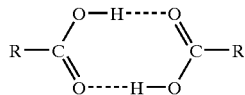

It is also well known that the vapor phase in equilibrium with solid NaCl at elevated temperature (T≧500° C.) is dominated by the dimeric species

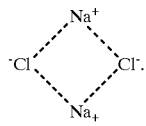

The formation and stability of the latter are attributed to the pair-wise Coulombic interaction of the constituent ions; see Doan et al. (1997) *J. Am. Chem. Soc.* 119:9810. The heat of dimerization for the acetic acid dimer has been measured to be 15 kcal/mol (Taylor (1951) *J. Am. Chem. Soc.* 73:315; Weltner (1955) *J. Am. Chem. Soc.* 77:3941), and that for $(NaCl)_2$ to be 48 kcal/mol. The corresponding pair-wise interaction between salt molecules of carboxylic acids, e.g., sodium acetate, has only recently been reported, by Doan et al. (1997), supra.

Perfluoropolyethers (PFPEs) are currently in use as lubricants in a variety of high-performance applications. PFPEs are commercially available in several distinct structural forms. Representative PFPEs are known by the brand names Demnum® (Daikin Kogyo Co., Ltd., Japan), Krytox® (DuPont Specialty Chemicals, Deepwater, N.J.), and Fomblin® Z (Zentek SRL, Milan, Italy), having the following structural formulae Demnum®:

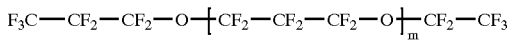

Krytox®:

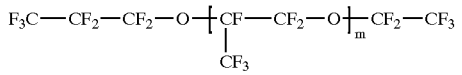

Fomblin®Z:

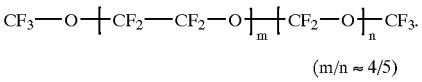

(m/n ≈ 4/5)

Krytox is synthesized by base-catalyzed polymerization of hexafluoropropylene oxide, as described by Gumbrecht (1966) *ASLE Trans.* 9:24, while Demnum is made similarly but starting with 2,2,3,3-tetrafluorooxetane. The hydrogen atoms in the resulting polymers are replaced by fluorine atoms by subsequent contact with $F_2$ in solution, as described by Ohsaka (1985) *Petrotech* (Tokyo) 8:840. Fomblin Z is synthesized by photooxidation of tetrafluoroethylene and is a linear, random copolymer of ethylene oxide and methylene oxide units; see Sianesi (1973) *Chim. Ind.* 55:208.

These PFPEs are also available with carboxylic acid end groups, as exemplified by Fomblin® Z-DIAC (Zentek SRL, Milan, Italy), Krytox®-H (DuPont) and Demnum®-SH (Daikin Kogyo Co. Ltd., Japan), having the structures Fomblin® Z-DIAC:

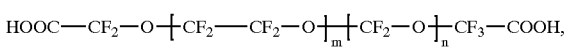

Krytox® -H:

$$F_3C—CF_2—CF_2—O—[CF(CF_3)—CF_2—O]_m—CF(CF_3)—CF_2—COOH$$ and

Demnum® -SH:

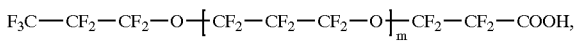

respectively. It has been found that the sodium salts of these polymers normally exist in the dimeric form under ambient conditions; see Doan et al. (1997), cited supra.

The inventors herein have now discovered that these and other metal salts of perfluorinated polyethers having one or more carboxylic acid groups are extremely effective anti-wetting agents and thus find utility in a host of applications, for example in corrosion-protective films. Although Doan et al. describes a method for synthesizing sodium salts of PFPE acids, the method described is problematic. That is, Doan et al. describes preparation of sodium salts of PFPE acids by reacting a PFPE acid (e.g., Fomblin® Z-DIAC, Krytox-H® or Demnum®-SH) with a sodium hydroxide solution, and then extracting the salt from the resulting emulsion with a fluorocarbon solvent. Although the intended product may be prepared using this technique, the method requires handling a multilayer fluid including a viscous interfacial gel layer, a cumbersome process that requires extreme care. This invention is in part directed to a new method for synthesizing metal salts of perfluorinated polyether acids that overcomes the aforementioned disadvantage of the Doan et al. synthesis.

The invention is also premised on the discovery that metal salts of PFPE acids are useful as anti-wetting agents and corrosion-protective agents. In this regard, it should be pointed out that certain fluorinated polymers, particularly poly(fluoroalkylacrylates) and poly(fluoroalkylmethacrylates), have been used as oil and water repellent agents (see, for example, B. E. Smart, "Organic Fluorine Compounds" in Kirk-Othmer Encyclopedia of Chemical Technology, Third Edition, Vol. 10, John Wiley & Sons, New York, 1980, p. 869). However, the adhesion force obtained using these polymers as coating agents is insufficient to provide sufficient durability in many contexts.

One important application of the present compounds that exploits the newly discovered properties is as corrosion-protective agents that bond strongly to metal and metal oxide substrates, as the compounds adhere well to metal-containing substrates. Furthermore, the compounds of the invention are extremely useful as corrosion-protective agents for magnetic recording disks and magnetic recording heads, particularly those having a carbon overcoat. Such overcoats are typically formed by sputter deposition from a graphite target, and are generally called protective carbon overcoats, "diamondlike" carbon overcoats, amorphous carbon overcoats, or, in the case of those overcoats formed by sputter deposition in the presence of a hydrogen-containing gas, hydrogenated carbon overcoats. Tsai et at. in "Structure and Properties of Sputtered Carbon Overcoats on Rigid Magnetic Media Disks," J. Vac. Science Technology A6(4), July/August 1988, pp. 2307–2314, describe such protective carbon overcoats and refer to them as amorphous "diamond-like" carbon films, the "diamondlike" referring to their hardness rather than their crystalline structure. IBM's U.S. Pat. No. 4,778,582 describes a protective hydrogenated disk carbon overcoat formed by sputtering a graphite target in the presence of Ar and hydrogen ($H_2$). The carbon overcoats may also be formed by plasma-enhanced chemical vapor deposition (CVD) and may include nitrogen in addition to hydrogen, as described by Kaufman et al. (1989) Phys. Rev. B 39:13053.

To increase the areal density of the data magnetically recorded on the disk, the recording head must be brought close to the magnetic layer, which means that the overcoat thickness must be substantially reduced, i.e., to less than 5 nm in future disk drives. Consequently, an important challenge faced by the disk drive industry is how to make protective disk overcoats that are ultra-thin yet still provide the desired durability and corrosion protection. However, the carbon overcoat sputter-deposited on the magnetic layer of storage disks often abounds with pinholes, through which the corrosion of metals in the magnetic and other underlayers may occur. Reducing the thickness of the carbon overcoat exacerbates the problem. The same drawback is encountered with the metallic elements of magnetic recording heads that are coated with a layer of sputtered carbon. Because metal salts of PFPE acids adhere well to metal-containing surfaces and poorly to carbon overcoats, the compounds are able to fill pinholes in the protective overcoat without adding any substantial thickness to the disk. Anti-corrosion strength is further enhanced by the exceptional water repellency of PFPE acid salts.

SUMMARY OF THE INVENTION

Accordingly, it is a primary object of the invention to address the above-mentioned need in the art by providing a method for synthesizing metal salts of PFPE acids.

It is another object of the invention to provide such a method which involves treating a perfluorinated polyether having at least one carboxylic acid group with a metal salt of a volatile organic acid, and then volatilizing the resulting organic acid.

It is another object of the invention to provide a method for treating a metal-containing substrate to enhance water repellency and corrosion resistance, wherein the method involves depositing a composition containing a metal salt of a perfluorinated polyether acid onto the substrate.

It is an additional object of the invention to provide such a method wherein the metal-containing substrate has a metal surface or a surface comprised of a metal oxide.

It is a further object of the invention to provide a corrosion-protected magnetic recording disk comprised of a substrate, a magnetic layer, and an amorphous carbon overcoat on the magnetic layer that has been treated with a composition containing a metal salt of a perfluorinated polyether acid as a corrosion-protective agent.

It is yet a further object of the invention to provide a corrosion-protected magnetic recording head having an amorphous carbon overcoat that has been treated with a composition containing a metal salt of a perfluorinated polyether acid.

Additional objects, advantages and novel features of the invention will be set forth in part in the description which follows, and in part will become apparent to those skilled in the art upon examination of the following, or may be learned by practice of the invention.

DETAILED DESCRIPTION OF THE INVENTION

Figure 1:
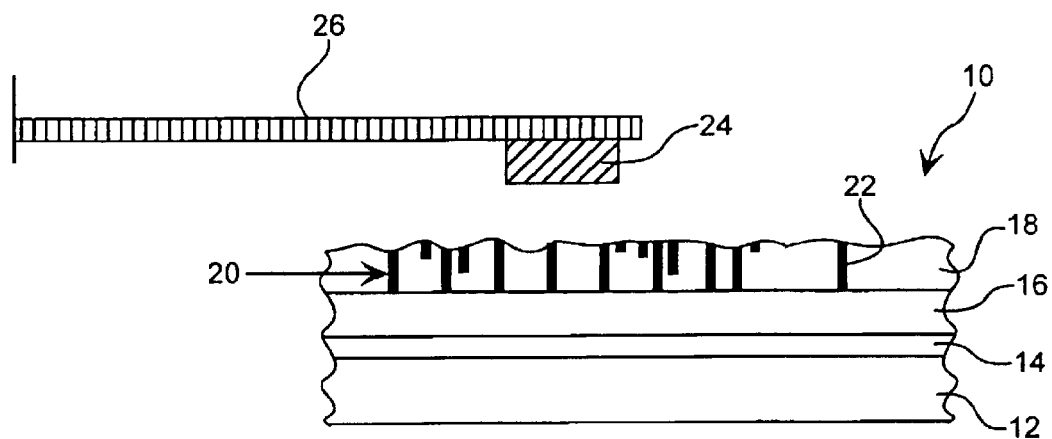
FIG. 1 schematically illustrates a cross-section of a magnetic recording disk treated with a corrosion-protective composition containing a metal salt of a PFPE acid as a corrosion-protective agent.

Before describing the present invention in detail, it is to be understood that this invention is not limited to specific process steps, substrates, magnetic recording devices, or the like, as such may vary. It is also to be understood that the terminology used herein is for the purpose of describing particular embodiments only, and is not intended to be limiting.

It must be noted that, as used in this specification and the appended claims, the singular forms "a," "and," and "the" include plural referents unless the context clearly dictates otherwise. For example, "a salt" refers to a mixture of salts as well as a single salt, "a polymer" (e.g., "a PFPE") refers to a mixture of polymers (e.g., PFPEs) as well as a single polymer (e.g., a PFPE), and the like.

The compounds to which the present invention is addressed are metal salts of perfluorinated polyethers having at least one carboxylic acid end group. These salts are also referred to herein as "metal salts of a PFPE acid," as "PFPE acid salts" and as compounds having the formula "PFPE-$COO^-M^+$" (wherein M is the metal atom of the salt), it being understood that the perfluorinated polyether PFPE can contain more than one —$COO^-M^+$ moiety and possibly some degree of hydrogenation as well. A novel synthesis for preparing such salts is provided, which, as noted above, overcomes the disadvantages inherent in the prior art. The salts are synthesized by treating a perfluorinated polyether having at least one carboxylic acid end group with a metal salt of a volatile organic acid under reaction conditions effective to convert the carboxylic acid group(s) of the perfluorinated polyether acid to the salt form and volatilize the resulting organic acid, resulting in a reaction product comprising a metal salt of the PFPE acid. The perfluorinated polyether that serves as the starting material is comprised of monomer units having the structure —$CF_2$—O—, —$CF_2$—$CF_2$—O—, —$CF_2$—$CF_2$—$CF_2$—O—, —$CF(CF_3)$—O—, —$CF(CF_3)$—$CF_2$O—, or a combination thereof, and has at least one carboxylic acid group, generally at one terminus of a substantially linear polymer, and typically has two carboxylic acid groups, one present at each terminus of a substantially linear polymer. Such polymers include, but are not limited to, the commercially available polymers Fomblin® Z-DIAC, Krytox®-H and Demnum®-SH. Although referred to herein as a "perfluorinated" polyether, the polymer may be partially hydrogenated, in which case up to about 50% of the fluorine atoms in the perfluorinated polyether are substituted with a hydrogen atom. The polymeric acid that serves as the starting material in the synthetic process generally has a number average molecular weight in the range of approximately 500 to 10,000, preferably 1000 to 5000, most preferably 2500 to 3500.

The metal salt of the volatile organic acid has the structure $RCOO^-M^+$ where M is the metal, preferably an alkali metal, e.g., sodium, and R is hydrocarbyl, typically alkyl, and preferably lower alkyl. Thus, an exemplary alkali metal salt is sodium acetate, $CH_3COONa$. The present method exploits the fact that the organic acid component of the alkali metal salt is volatile; for example, acetic acid has a boiling point of 118° C. As noted above, the perfluorinated polyether starting material is reacted with the metal salt of the volatile organic acid under reaction conditions effective to convert carboxylic acid groups to the salt form and volatilize the resulting organic acid. Suitable reaction conditions involve heating a mixture of the perfluorinated polyether acid and the metal salt of the volatile organic acid at a temperature of at least about 130° C. for at least 48 hours. Preferably, a fluorinated solvent such as perfluorohexane (e.g., FC72® 3M, St. Paul, Minn.) is then added to the reaction mixture and the mixture is heated at reflux until smooth. Additional fluorinated solvent may be added at this point; in addition, a lower alkanol such as methanol may be added to remove unreacted metal salt, and trifluoroethanol may be added to minimize gel formation. The reaction product is then isolated by extraction, e.g., using a lower alkanol such as methanol. Specific examples describing synthesis of the sodium salt of Demnum-SH and Z-DIAC, respectively, are included herein as Examples 1 and 2.

These PFPE acid salts may be applied to a substrate surface to form a film thereon. Alternatively, a pinhole-containing layer on a substrate—e.g., an amorphous carbon coating on a metallic substrate—may be treated with a solution of a PFPE acid salt such that the pinholes become filled with the salt solution, preventing corrosion of the underlying metal-containing layer or layers. The compounds prepared as synthesized above have been found to be extremely effective water-repellent and oil-repellent agents, and adhere well to metal-containing surfaces, e.g., metallic surfaces or surfaces of metal oxides. Adhesion to an aluminum surface is described in Example 3, and adhesion to a NiFe alloy surface is described in Example 4.

One important area in which the present compounds find utility is as corrosion-protective layers in magnetic storage devices such as magnetic storage disks and magnetic recording heads. Of particular interest are magnetic storage disks and magnetic recording heads that have an overcoat of essentially amorphous carbon, as disclosed, for example, in U.S. Pat. No. 5,030,494 to Ahlert et al. and U.S. Pat. No. 5,075,287 to Doerner et al., both assigned to IBM Corporation. As explained in the aforementioned patents, many rotating rigid disk drives include read/write transducers (or "heads") supported on a carrier (or "slider") that ride on a cushion or gearing of air above the surface of a magnetic recording disk when the disk is rotating at operating speed. The slider has an air-bearing surface ("ABS"), typically in the form of a plurality of rails, and is connected to a linear or rotary actuator by means of a suspension. There may be a stack of disks in the disk drive with the actuator supporting a number of sliders. The actuator moves the sliders radially so that each head may access the recording area of its associated disk surface. The slider in the disk drive is biased toward the disk surface by a small force from the suspension. The ABS of the slider is thus in contact with the disk surface from the time the disk drive is turned on until the disk reaches a speed sufficient to cause the slider to ride on the air bearing. The ABS of the slider is again in contact with the disk surface when the disk drive is turned off and the rotational speed of the disk falls below that necessary to create the air bearing. This type of disk drive is called a contact start/stop (CSS) disk drive. To provide wear resistance for the ABS in a CSS disk drive, a protective carbon overcoat may be placed on the slider rails. IBM's U.S. Pat. No. 5,159,508 describes a slider with air-bearing rails having an amorphous carbon overcoat that is adhered to the rails by a silicon adhesion layer.

The magnetic recording disk in a CSS rigid disk drive is typically a thin film disk comprising a substrate, such as a disk blank made of glass, ceramic, glassy carbon or an aluminum-magnesium (AlMg) alloy with a nickel-phosphorous (NiP) surface coating, and a cobalt-based magnetic alloy film formed by sputter deposition over the substrate. A protective overcoat, such as a sputter-deposited amorphous carbon film, is formed over the magnetic layer to provide corrosion resistance and wear resistance from the ABS of the slider. The overcoat may further include relatively small amounts of embedded iron (Fe), tungsten (W) or tungsten carbide (WC) to improve wear resistance and minimize the likelihood of damage to disk file components (see U.S. Pat. No. 5,030,494 to Ahlert et al., cited above). Such overcoats are typically formed by sputter deposition from a graphite target, and as explained in the Background section, are generally called protective carbon overcoats, "diamondlike" carbon overcoats, amorphous carbon overcoats, or, in the case of those overcoats formed by sputter deposition in the presence of a hydrogen-containing gas, hydrogenated carbon overcoats. In addition to the magnetic layer and the protective overcoat, the thin film disk may also include a sputter-deposited underlayer, such as a layer of chromium (Cr) or a chromium-vanadium (CrV) alloy, between the substrate and the magnetic layer, and a sputter-deposited adhesion layer, such as a Cr, tungsten (W) or titanium (Ti) layer, between the magnetic layer and the protective overcoat.

As alluded to above, a problem associated with the aforementioned protective overcoat is that the sputter-deposited carbon layer often abounds with pinholes, through which the corrosion of metals in the magnetic and other underlayers may occur. These pinholes can be detected in a number of ways, for example using a cerium etching technique, which employs $(NH_4)_2Ce(NO_3)_6$ as an oxidizing agent and selectively oxidizes metal, e.g. chromium metal, in the underlayer. Corrosion debris evolved at pinhole sites may thus be observed and counted with an optical microscope. The present compounds, since they adhere well to metal and metal oxide surfaces but do not adhere to amorphous carbon, can be applied to the surface of the amorphous carbon overcoat so as to fill in the pinholes and eliminate or at the very least minimize the possibility that the underlying layers may corrode.

Thus, in one embodiment, an improved magnetic recording disk is provided that is fabricated by treatment with a metal salt of a perfluorinated polyether acid. At a minimum, the magnetic recording disk comprises: a substrate; a magnetic layer formed over the substrate; an overcoat formed over the magnetic layer, the overcoat being a film having a substantially planar surface and comprising primarily carbon in the essentially amorphous form and optionally one or more of tungsten or tungsten carbide distributed throughout and embedded within the carbon; and a corrosion-protective composition filling pinholes in the carbon overcoat, the corrosion-protective composition containing a metal salt of a PFPE acid as a corrosion-protective agent. Optimally, the magnetic layer is comprised of a cobalt-based magnetic alloy film formed by sputter deposition over the substrate; a particularly preferred cobalt-based magnetic alloy is CoPtCrB, as described in IBM's U.S. Pat. No. 5,523,173 to Doerner et al.

Figure 2:
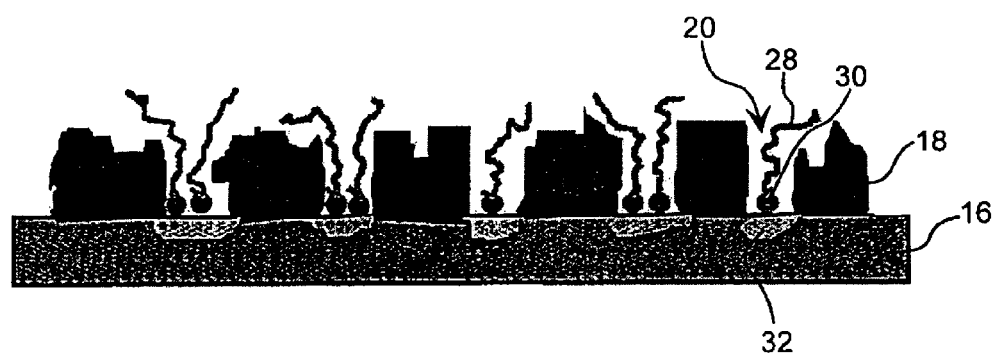
FIG. 2 schematically illustrates a cross section of a treated substrate wherein PFPE acid salts as provided herein fill the pinholes present in a sputtered carbon layer.

A thin film disk 10 according to the present invention is illustrated in section in FIG. 1. The disk 10 includes a substrate 12, typically comprising a disk blank made of glass, ceramic, glassy carbon or an aluminum-magnesium (Al—Mg) alloy with a nickel-phosphorous (Ni—P) surface coating. A chromium (Cr) or a chromium-vanadium (Cr—V) alloy 14 underlayer is sputter-deposited on the substrate. Over the underlayer 14 is deposited a magnetic layer 16, which preferably, as explained above, is comprised of a cobalt-based magnetic alloy such as CoPtCrB. Over the magnetic layer 16 is overcoat 18 of sputter-deposited amorphous carbon, containing pinholes 20. The pinholes 20 are filled with a corrosion-protective composition 22 containing a PFPE acid salt; filling the pinholes in this way prevents exposure of the underlying magnetic layer. Magnetic recording head 24 is mounted on arm 26, which is connected to means (not shown) for positioning head 24 in a generally radial direction with respect to disk 10. FIG. 2 illustrates more specifically how molecules of the PFPE acid salt 28, with polar, ionic end group 30, fill the pinholes 20 in the amorphous carbon overcoat 18, protecting areas 32 in the underlying metal-containing magnetic layer 16 that would otherwise be susceptible to corrosion. It may be desirable to then coat the pinhole-filled surface with a layer of a perfluoropolyether lubricant (not shown).

As noted above, the PFPE metal salts of the invention are also useful in providing corrosion protection for magnetic recording heads and associated head assembly components, particularly when a sputter-deposited amorphous carbon overcoat is used as described with respect to magnetic recording disks. A magnetic recording head assembly of the invention will generally include at least one component comprised of an oxide, nitride or carbide of aluminum, zirconium, silicon or titanium and have an overcoat of sputter-deposited amorphous carbon, wherein the improvement lies in the use of a corrosion-protective agent of the invention to fill pinholes present in the carbon overcoat and prevent exposure of the underlying layer.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

EXPERIMENTAL

The following examples are put forth so as to provide those of ordinary skill in the art with a complete disclosure and description of how to prepare and use the oligomers and polymers disclosed and claimed herein. Efforts have been made to ensure accuracy with respect to numbers (e.g., quantities, temperature, etc.) but some errors and deviations should be accounted for. Unless indicated otherwise, parts are parts by weight, temperature is in ° C. and pressure is at or near atmospheric. Additionally, all starting materials were obtained commercially or synthesized using known procedures.

EXAMPLE 1

Synthesis of Metal Salts of PFPE Acids:

Demnum-SH: The sodium salt of Demnum-SH was prepared as follows. Twenty-five (25) grams of Demnum-SH (Daikin Kogyo Co., Ltd., Japan) and 2 grams of sodium acetate were mixed in a 100 ml beaker. The mixture was stirred at 140~150° C. with stirring. The mixture bubbled and became rigid within about an hour. Heating at 145° C.

was continued for three days until bubbling stopped completely. The reaction mixture was then transferred into an 250 cc Erlenmeyer flask, and 50 cc of FC72 (perfluorohexane) were added. A condenser was attached, and the mixture was refluxed at 60° C. until smooth. The mixture was then transferred into a 250 cc separatory funnel, and 50 cc of FC72 (additional), 50 cc of methanol (for removal of excess Na-acetate), and 10 cc of TFE (trifluoroethanol, $CF_3$—$CH_2$—OH) were added to minimize gel formation. The mixture was shaken in the separatory funnel vigorously and then allowed to stand overnight. Two clear layers developed. The upper methanol layer contained excess sodium acetate. The lower layer (~100 cc) contained the desired Demnum-SH salt. The lower layer was collected in a deep container, and heated gently (~50° C.) overnight to remove the solvent. The product was then dried in a vacuum oven maintained at ~100° C. overnight.

The sodium salt of Fomblin Z-DIAC (obtained from Ausimont USA, Inc.) was prepared following essentially the same procedure. In this case, however, after the separatory funnel process, only ~50% (by weight) of the expected product was recovered from the FC72 layer. The balance of the material was found in the $CH_3OH$ layer. An IR analysis proved that both fractions were the Na salt of Fomblin Z-DIAC. An F-19 NMR analysis revealed, however, that the number average molecular weight of the $CH_3OH$ fraction was 1500, while that of the FC72 fraction was 3000. The number averaged molecular weight of the starting Fomblin Z-DIAC was 2000. The molecular weight of the starting Demnum-SH was 3000. Since Demnum-SH is monofunctional, while Z-DIAC is bifunctional, it was concluded that in the synthesis of the Na salt of Demnum-SH, very little product molecules resulted that were small enough to be soluble in methanol. It was further concluded that, for the Na salts of Fomblin Z-DIAC of molecular weight ~1500, the polarity rendered by the Na-carboxylate groups attached at both ends of a molecule is such that it makes the entire molecule soluble in methanol.

Figure 3:
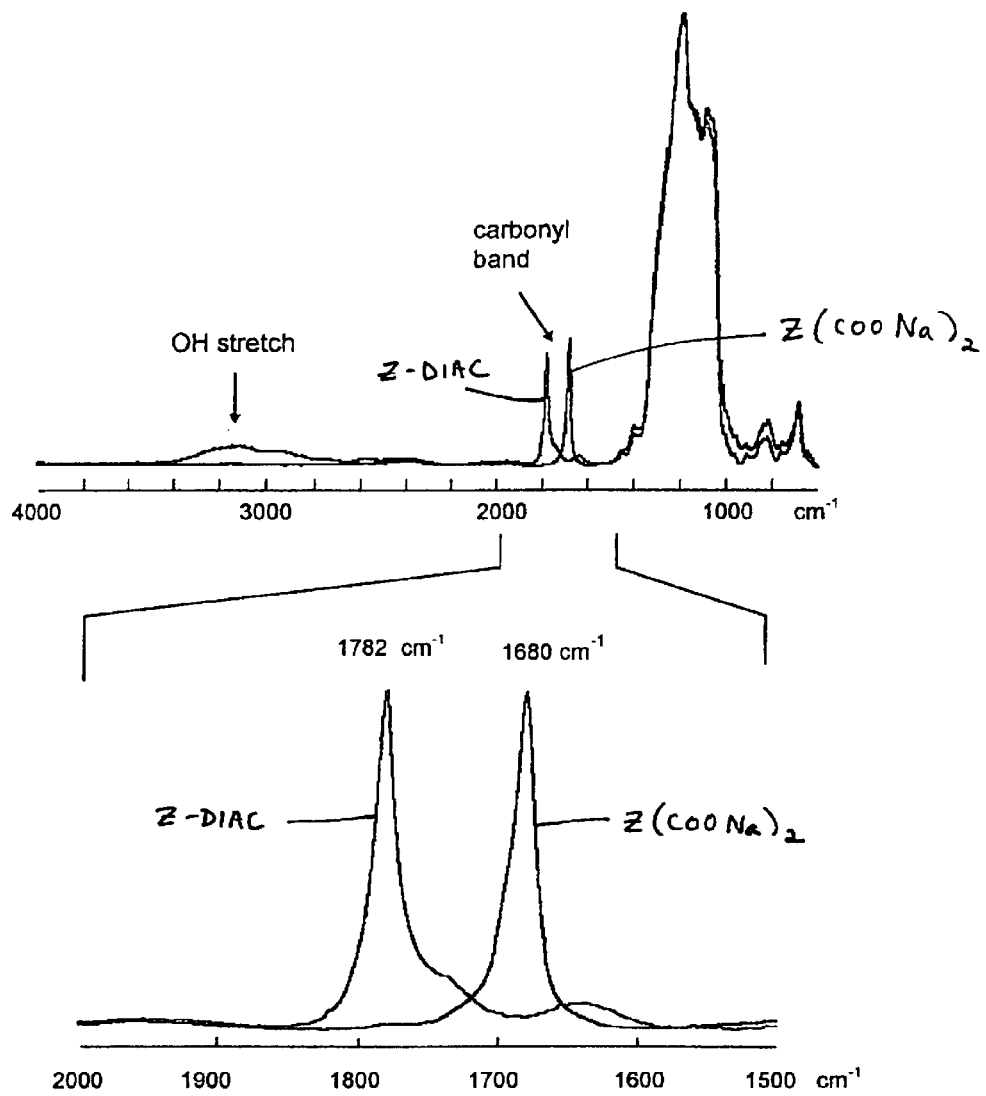
FIG. 3 shows the IR spectra of Fomblin Z-DIAC and its sodium salt, as described in Example 1.
Figure 4:
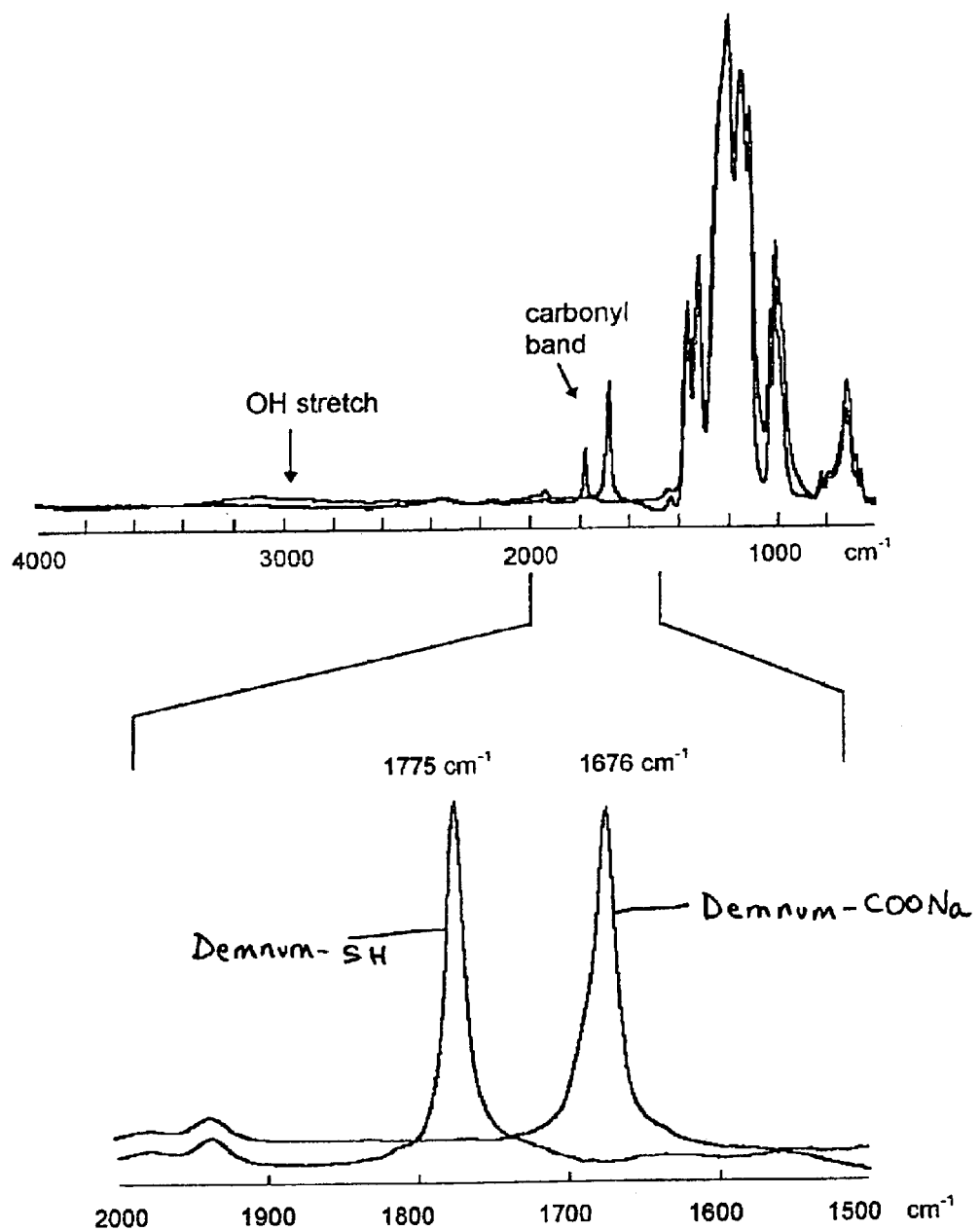
FIG. 4 shows the IR spectra of Demnum-SH and its sodium salt, also as described in Example 1.

FIG. 3 shows the IR spectra of the starting Fomblin Z-DIAC and its Na salt of molecular weight 3000. FIG. 4 shows the IR spectra of starting Demnum-SH and its Na salt. In both cases the product integrity is attested by the complete shift of the carbonyl band from ~1780 to ~1680 $cm^{-1}$; see Doan et al. (1997) *J. Am. Chem. Soc.* 119:9810.

For simplicity, the abbreviations $Z(COONa)_2$ and D-COONa will be used hereinafter to indicate respectively the Na salts of Fomblin Z-DIAC and Demnum-SH thus synthesized. Unless mentioned otherwise, $Z(COONa)_2$ refers to the product obtained in the FC72 fraction (with the number averaged molecular weight of ~3000), as does D-COONa (also with the number averaged molecular weight of ~3000).

It was found that both $Z(COONa)_2$ and D-COONa were sparingly soluble in FC72 (perfluorohexane; b.p. 58° C.) but were quite soluble in TFE (trifluoroethanol, b.p. 77° C.) and also in HFE-A (nonafluoro(iso)butyl-methyl ether; b.p. 60° C.).

EXAMPLE 2

Figure 5:
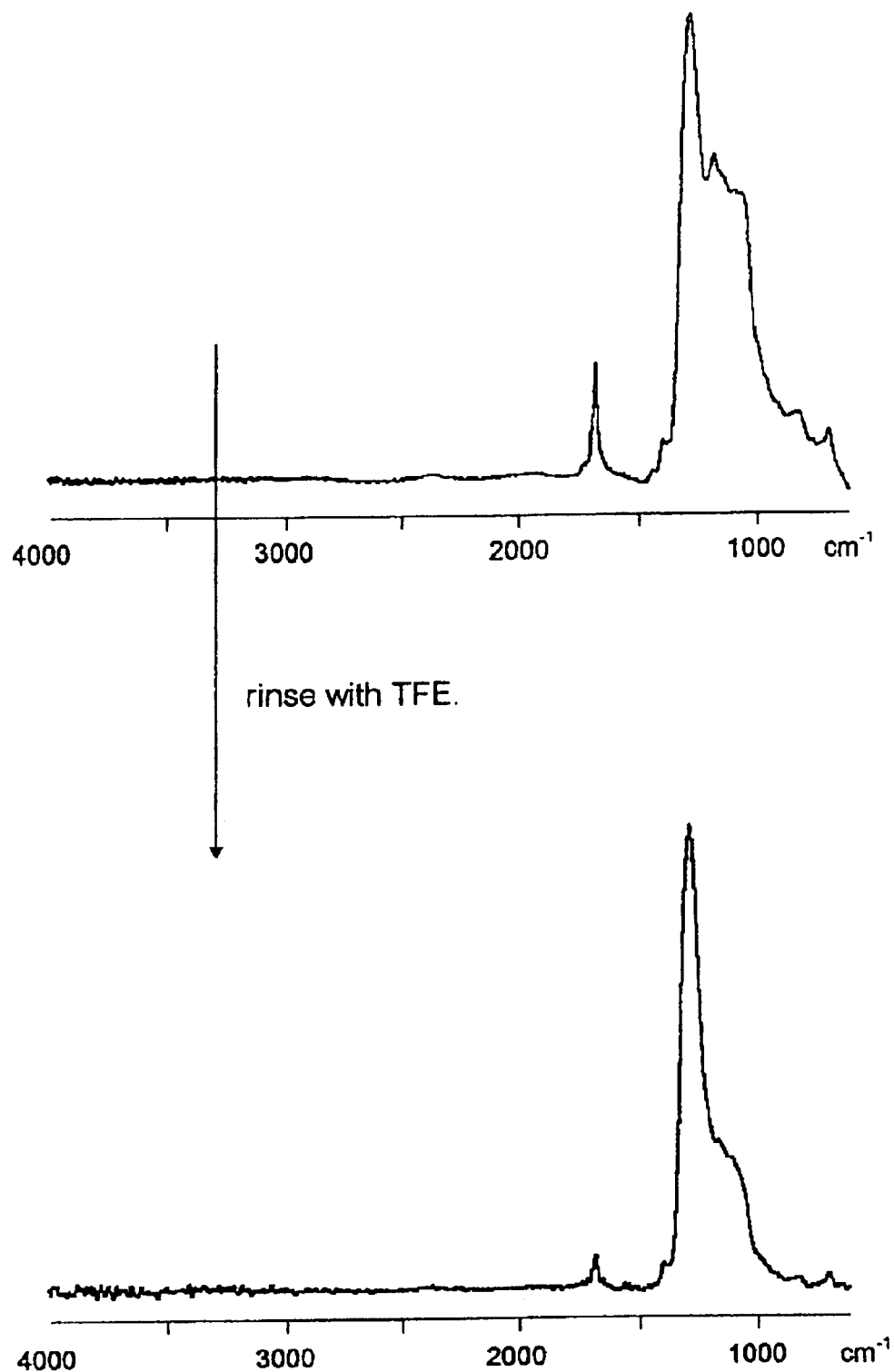
FIG. 5 shows the IR spectra of the sodium salt of Demnum-SH before (upper spectrum) and after (lower spectrum) rinsing with trifluoroethanol (TFE), as described in Example 2.
Figure 6:
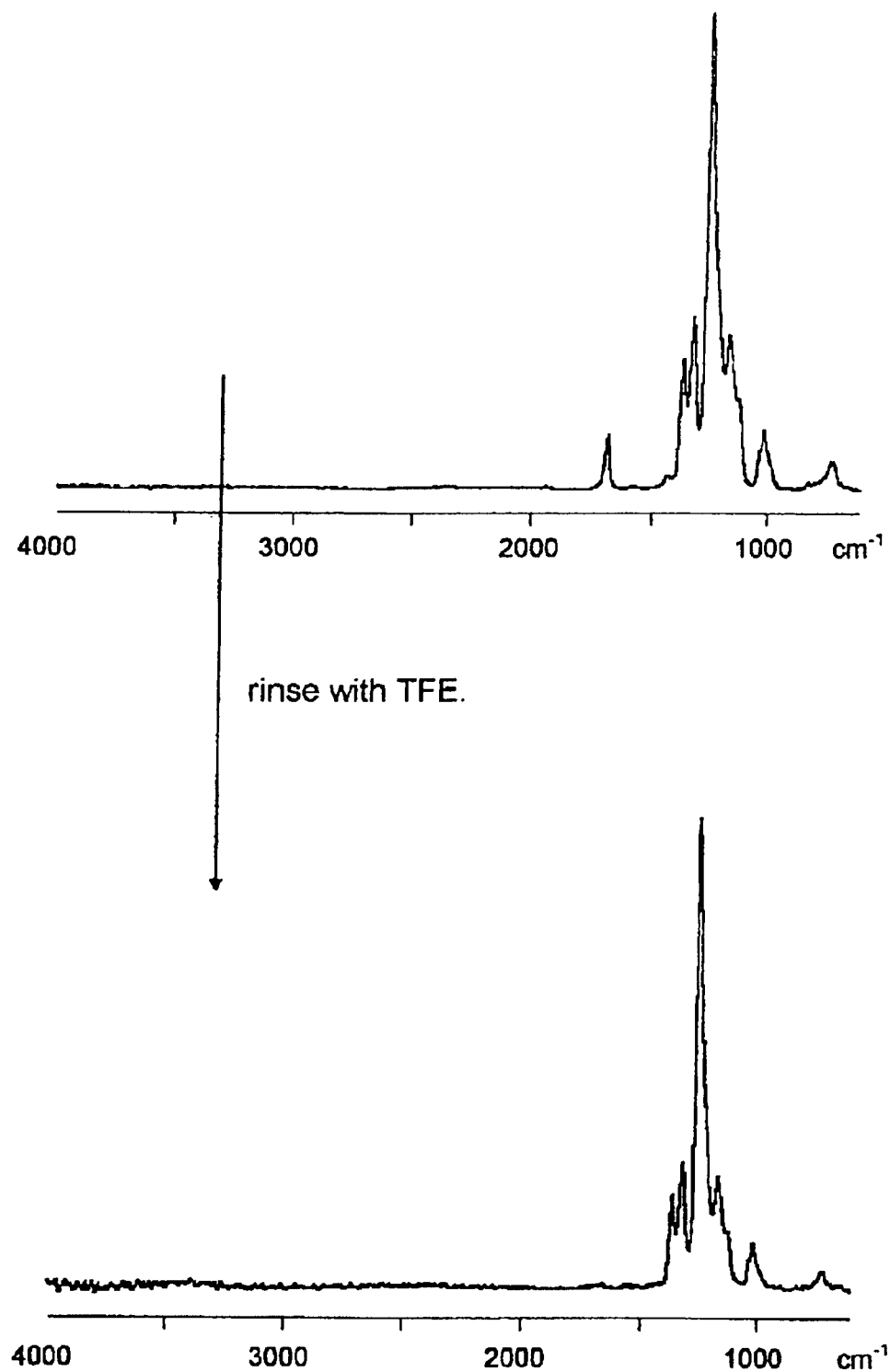
FIG. 6 shows the IR spectra of the sodium salt of Fomblin Z-DIAC before (upper spectrum) and after (lower spectrum) rinsing with trifluoroethanol (TFE), as described in Example 2.

Adhesion of $Z(COONa)_2$ and D-COONa on an Aluminum Surface:

FIG. 5 shows the IR spectra (obtained by the reflectance technique) of $Z(COONa)_2$ applied as a thin smear on an aluminum plate (upper spectrum) and after the same plate was rinsed thoroughly with pure TFE (lower spectrum). The corresponding spectra observed with D-COONa are shown in FIG. 6. The spectra observed after the TFE rinse were attributed to a molecular monolayer of the salt molecules adhering to the aluminum surface. Essentially the same spectrum was observed from an aluminum coupon which was dipped into a TFE solution of $Z(COONa)_2$ (0.3 wt. %) and then rinsed thoroughly with pure TFE.

A further study revealed that these monolayers of $Z(COONa)_2$ or D-COONa adhering to the aluminum surface were not removed when the sample coupons were immersed in water with stirring for one hour, nor when they were immersed in TFE with stirring for one hour.

The thickness of the D-COONa film remaining on an aluminum plate after the dip-and-rinse process was measured by the ellipsometry technique and determined to be 70 Å. The contact angle (of water droplet) of the aluminum plate increased from 43° to 115° upon adhesion of D-COONa by the dip-and-rinse process. The contact angle determined for the treated plate was close to that of a Teflon-coated surface. It is thus strongly suggested that adhesion occurs solely due to the interaction between the polar sodium-carboxylate unit and the polar metal surface, with the nonpolar perfluoropolyether moiety extending freely outward.

As expected, the aluminum surface thus treated was extremely water repellent and oil repellent. The treated surface does not permit writing with either a water-based pen or an oil-based pen.

EXAMPLE 3

Figure 7:
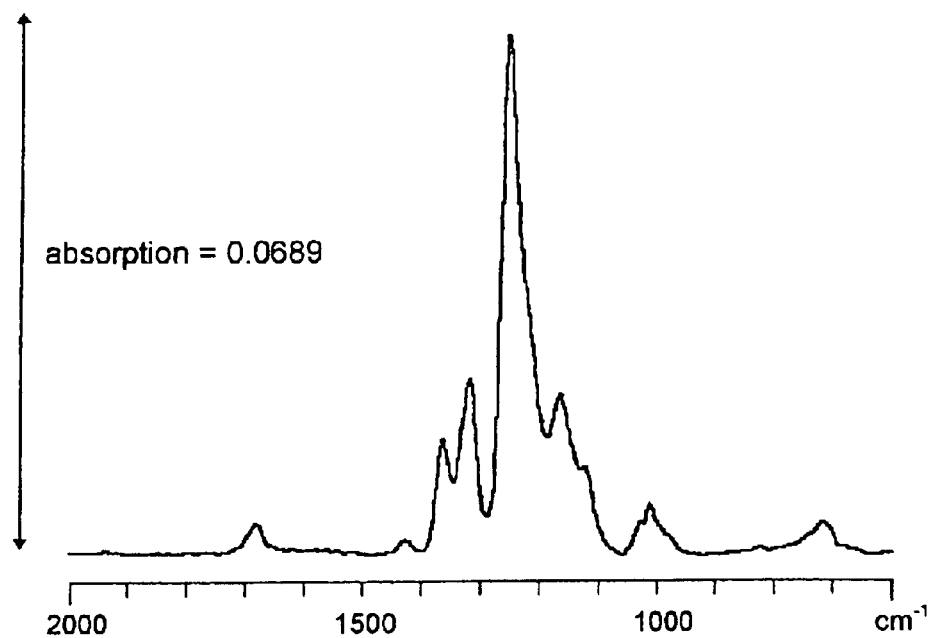
FIG. 7 shows the IR spectra of the sodium salt of Demnum-SH adsorbed onto an aluminum plate (upper spectrum) and onto a substrate surface composed of a nickel-iron (NiFe) alloy, as described in Example 3.
Figure 7:
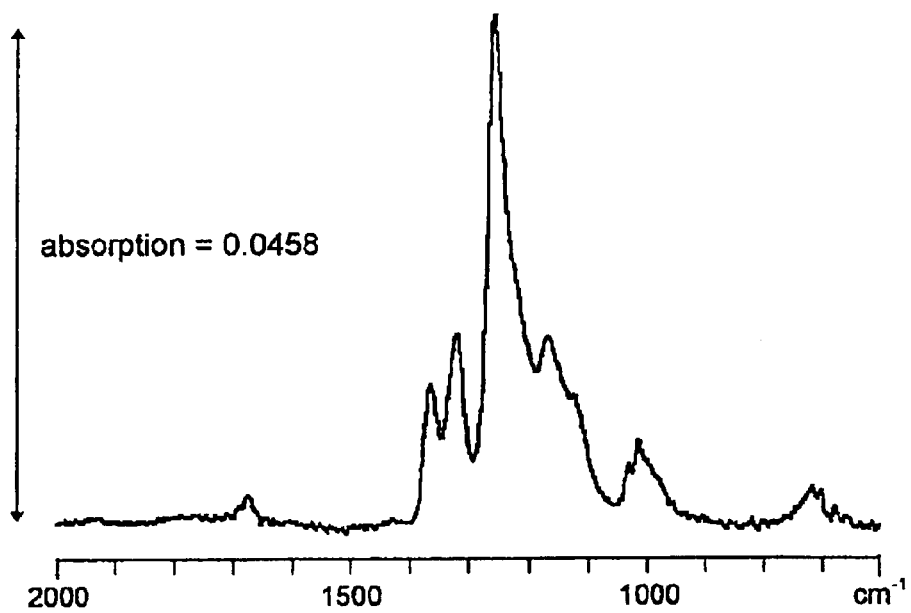

Adsorption on Other Metal Surfaces:

In order to demonstrate that the observed strong adsorption of the Na salts of PFPE-acids was not uniquely limited to the aluminum surface as described in Example 2, adsorption of D-COONa upon a NiFe alloy surface was examined. FIG. 7 compares the spectra observed from an aluminum plate and a NiFe disk, both of which had been dipped into a TFE solution of D-COONa (0.3 wt. %) and then thoroughly rinsed with pure TFE. It was revealed that a substantially identical quantity of D-COONa molecules adhered to the NiFe surface.

EXAMPLE 4

Figure 8:
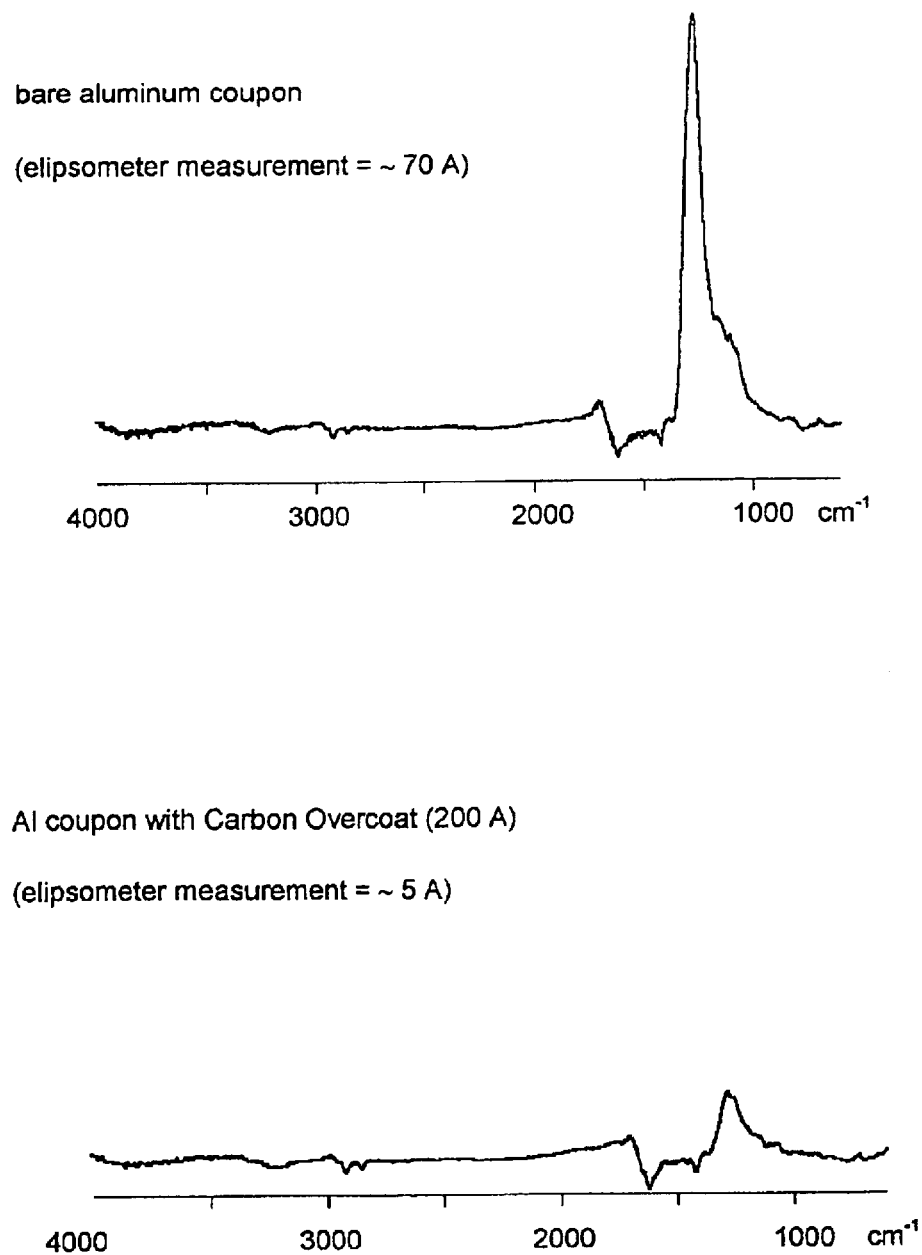
FIG. 8 shows the IR spectra of the sodium salt of Fomblin Z-DIAC present as a film on a bare aluminum plate (upper spectrum) and on an aluminum plate coated with a carbon film (lower spectrum), as described in Example 4.

Interaction Between Na-PFPE Carboxylate and Sputtered Carbon:

In order to verify that the observed strong adsorption of D-COONa or $Z(COONa)_2$ to metal surfaces was due to the Coulombic interaction between the extremely polar (ionic) Na-carboxylate end group of the polymer molecule and the polar constituents of the metal (oxide) surface, the adsorption of $Z(COONa)_2$ upon aluminum plates coated with a carbon film of thickness ~200 Å was evaluated. The IR spectra observed from bare and carbon coated aluminum plates which had been soaked in a TFE solution of $Z(COONa)_2$ (1%) for three hours followed by thorough rinsing with pure TFE are compared in FIG. 8. The immersion process was used in order to ensure (possible) bonding to a porous carbon medium. It was revealed that only a trace amount of D-COONa was adsorbed on the carbon coated aluminum. The ellipsometry measurement showed the presence of $Z(COONa)_2$ corresponding to a thickness of 5 Å. It was surmised that the small amount of adsorption occurred through pinholes of the carbon film.

EXAMPLE 5

Figure 9:
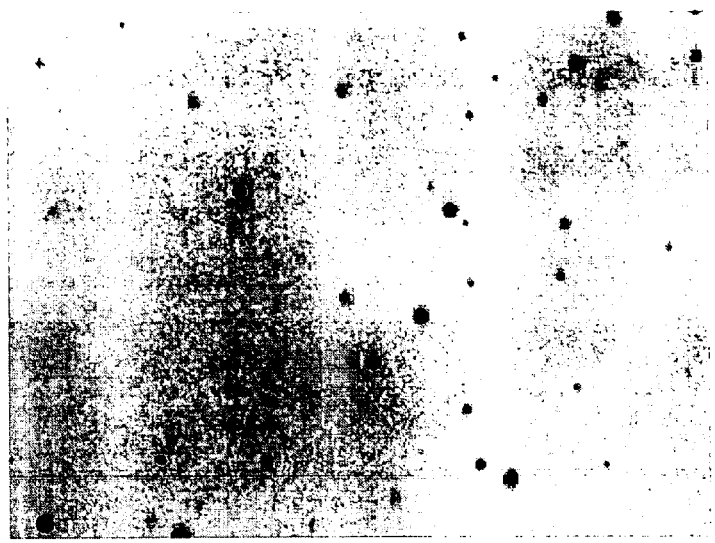
FIG. 9 shows the microscopic images of corrosion debris developed by cerium etching of the magnetic disks prepared in Example 4. The upper image illustrates the results obtained with the bare carbon-coated magnetic disks, while the lower image illustrates the results obtained with the disks treated with a corrosion-protective composition containing a metal salt of a perfluoropolyether acid as described in Example 5.
Figure 9:
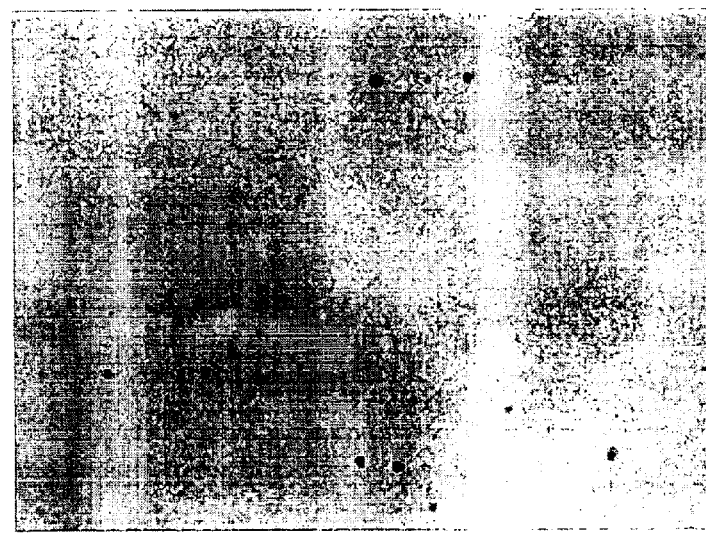

Sealing Pinholes of Carbon Overcoat on Magnetic Storage Disk:

Since Na-PFPE carboxylate molecules adhere strongly to a metal oxide surface but not to the surface of sputtered carbon, Na-PFPE carboxylate molecules adhere to the metal oxide layer of a magnetic storage disk through pinholes in a sputter-deposited amorphous carbon overcoat. FIG. 9 compares the microscopic images of corrosion debris developed by the cerium etching technique on two disks of the same lot. The cerium etching technique uses $(NH_4)_2Ce(NO_3)_6$ as an oxidizing agent and selectively oxidizes the underlayer. Corrosion debris evolved at pinhole sites may thus be observed and counted with an optical microscope. Prior to etching, one of the disks was dipped into a TFE solution of D-COONa (1%) followed by a thorough rinsing with pure TFE. It was revealed that the pinhole density was reduced by a factor of three by the dip-and-rinse process of a D-COONa/TFE solution.

EXAMPLE 6

Figure 10:
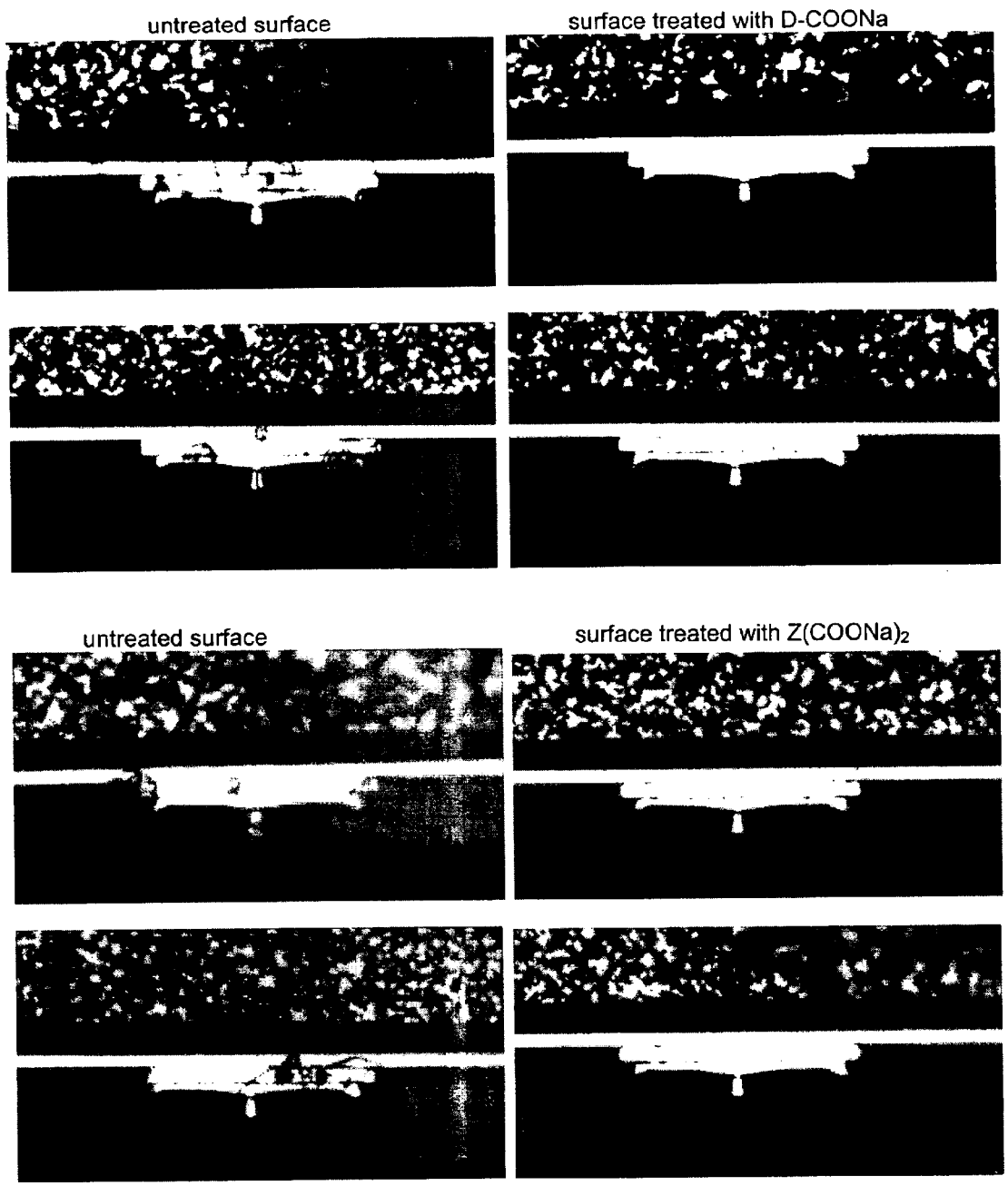
FIG. 10 shows the microscopic images of corrosion debris developed by exposing to an atmosphere equilibrated with 1 N HCl solution (a) an untreated magnetic recording head assembly having an amorphous carbon overcoat (left side), (b) a magnetic recording head assembly having an amorphous carbon overcoat treated with a corrosion-protective composition containing the sodium salt of Demnum-SH (upper right), and (c) a magnetic recording head assembly having an amorphous carbon overcoat treated with a corrosion-protective composition containing the sodium salt of Fomblin Z-DIAC (lower right), as described in Example 6.

Corrosion Protection of GMR Heads:

It is particularly essential that the metallic elements of GMR (giant magnetoresistance) heads in magnetic storage disk systems are protected from corrosion. To that end, an entire head assembly was coated with a layer of sputtered carbon. The corrosion, however, could still develop through pinholes of the carbon overcoat. It was found that by exposing an HGA (the head and gimbals assembly) to an atmosphere equilibrated with 1.0 N HCl solution for thirty minutes, a sufficient amount of corrosion debris developed that was observable by an optical microscope. FIG. 10 shows, on the left side, the images of several heads that have been subjected to this accelerated HCl vapor test. Shown on the right side are the images of heads that had been first immersed in a TFE solution of D-COONa (1%) or $Z(COONa)_2$ (1%), rinsed sequentially with pure TFE, FC72, and IPA (isopropyl alcohol), and then subjected to the HCl vapor test. The efficacy of the immersion in a Na-PFPE carboxylate, solution is evident. We surmise, as before, that pin holes in the carbon layer are effectively sealed by Na-PFPE carboxylate molecules, and hydrophobic PFPE chains extending outward block intrusion of polar molecules such as $H_2O$ and HCl.

What is claimed is:

1. In a magnetic recording head comprised of (a) a substrate of an oxide, nitride or carbide of aluminum, zirconium, silicon or titanium and having (b) an overcoat comprising a film composed primarily of carbon in the essentially amorphous form and having pinholes therein exposing the substrate, wherein the improvement comprises treating the magnetic recording head with a corrosion-protective composition so as to fill the pinholes of the overcoat, the composition containing a corrosion-protective agent comprised of a metal salt of a fluorinated polyether having at least one carboxylic acid group.

2. The magnetic recording head of claim 1, wherein the fluorinated polyether is a perfluorinated polyether.

3. The magnetic recording head of claim 2, wherein the perfluorinated polyether has one carboxylic acid end group.

4. The magnetic recording head of claim 3, wherein the perfluorinated polyether has two carboxylic acid groups.

5. The magnetic recording head of claim 2, wherein the perfluorinated polyether is comprised of monomer units having the structure $-CF_2-O-$, $-CF_2-CF_2-O-$, $-CF(CF_3)-O-$, $-CF(CF_3)-CF_2-O-$, or a combination thereof.

6. The magnetic recording head of claim 1, wherein the fluorinated polyether is a linear polymer.

7. The magnetic recording head of claim 1, wherein the metal salt is an alkali metal salt.

8. The magnetic recording head of claim 1, wherein the fluorinated polyether has a number average molecular weight in the range of approximately 500 to 10,000.

9. The magnetic recording head of claim 8, wherein the fluorinated polyether has a number average molecular weight in the range of approximately 1000 to 5000.

10. The magnetic recording head of claim 9, wherein the fluorinated polyether has a number average molecular weight in the range of approximately 2500 to 3500.

11. The magnetic recording head of claim 1, wherein the improvement further comprises coating the carbon overcoat with a lubricating film of a perfluoropolyether prior to deposition of the corrosion-protective composition.

* * * * *